United States Patent Office 3,637,875

Patented Jan. 25, 1972

3,637,875

PROCESS FOR OBTAINING TETRACHLOROETHANES

Yves Correia and Jean-Claude Strini, Saint-Auban, France, assignors to Produits Chimiques Pechiney-Saint-Gobain, Neuilly-sur-Seine, France No Drawing. Filed Dec. 24, 1968, Ser. No. 786,736
Claims priority, application France, Dec. 29, 1967, 134,293
Int. Cl. C07c *17/04*
U.S. Cl. 260—658 R 4 Claims

ABSTRACT OF THE DISCLOSURE

A process for the simultaneous preparation of symmetrical and unsymmetrical tetrachloroethanes by chlorination of dichloroethylenes in the liquid phase in the absence of light and catalyst.

This invention relates to a process for the simultaneous preparation of symmetrical and unsymmetrical tetrachloroethanes by chlorination of dichloroethylenes.

It is well known that the chlorination of dichloroethylenes, in the presence of light radiations, yields tetrachloroethanes. According to the publication of M. L. Poutsma and R. L. Himan, Journal of the American Chemical Society, vol. 86, page 3807 (1964), it is also known that in the absence of light and at a temperature of 25° C., the dichloroethylenes remain inactive over a long period of time and they do not react with chlorine.

This invention is based upon the surprising discovery that the chlorination of dichloroethylenes to form tetrachloroethanes can be carried out in the absence of light with a yield higher than that obtained in the presence of light.

It is an object of this invention to produce and to provide a method for producing tetrachloroethanes by the chlorination of dichloroethylenes in the absence of light radiations.

In accordance with the practice of this invention, dichloroethylenes are caused to react in the liquid phase with molecular chlorine in a reaction zone, in the absence of light radiations, at a temperature within the range of 50° to 90° C., and in the absence of a catalyst.

By the term "absence of a catalyst," it should be understood that if traces of Fe, Ni, Al, Cu, Ti, Sb, S and/or P are present in the reaction medium, such as in the form of a chloride, either as impurities or as a result of corrosion of the reaction vessel, such traces should represent a proportion less than 0.004% by weight, when expressed in the form of the corresponding chloride, based upon the liquid reaction phase and preferably less than 0.0025% by weight.

Dichloroethylenes used in the liquid phase can, in accordance with the practice of this invention, be placed in solution in one or more halogenated solvents, such as hexachlorobutadiene or other non-volatile solvents which are practically inert under the operating conditions. As the solvent, it is preferred to make use of chlorinated compounds prepared by the process of this invention. The dichloroethylenes can be introduced into the reaction medium in undiluted form or diluted with the solvent prior to their introduction.

Dichloroethylenes used as the raw material in the practice of this invention consist essentally of a mixture of 80 to 10 molar percent of cis- and/or trans-1,2-dichloroethylene and from 20 to 90 molar percent of 1,1-dichloroethylene.

It has been found that cis- and/or trans-1,2-dichloroethylenes, which are considered like 1,1-dichloroethylene as being insensitive to the action of chlorine in the absence of light, can be chlorinated by the process of this invention as readily as 1,1-dichloroethylene.

Applicants have found that in order to obtain a high selectivity and consequently a high yield above 95%, such as up to 99%, of tetrachloroethylenes, the starting dichloroethylene should be free of or practically free (less than 0.001% by weight) of stabilizers of the type usually incorporated in dichloroethylenes, such as phenol or p-methoxyphenol, which should be eliminated before the chlorination reaction.

Furthermore, it has been established that the chlorination reaction of 1,1-dichloroethylene and of cis- and trans-1,2-dichloroethylenes, in the absence of a catalyst, occurs by way of free radical mechanism corresponding to the following equations:

$$CCl_2{=}CH_2+Cl_2 \rightarrow CCl_3-CH_2Cl$$

$$CHCl{=}CHCl+Cl_2 \rightarrow CHCl_2-CHCl_2$$

The chlorination rates of 1,1-dichloroethylene and cis- and trans-1,2-dichloroethylenes are practically the same. The very small amount of pentachloroethane which can form either from 1,1,1,2-tetrachloroethane or from 1,1,2,2-tetrachloroethane by direct substitution of a hydrogen atom with chlorine explains why the formation of trichloroethylene is incapable of being observed. The formation of 1,1,1-trichloroethane is not observed either since the hydrochlorination of 1,1-dichloroethylene cannot occur in the absence of a catalyst.

In accordance with this invention, it is important to limit the conversion rate of dichloroethylenes to within the range of 80 to 95 molar percent and preferably 85 to 93 molar percent for optimum conditions for obtaining tetrachloroethanes. Thus, in a continuous process, the proportion of unconverted symmetrical and/or unsymmetrical dichloroethylenes is recycled to the reaction medium to which fresh dichloroethylenes are added.

The residence time of the reactants in the reaction zone may vary within the range of 2 to 9 hours and preferably 4 to 6 hours.

The molecular chlorine used in the practice of this invention can be either in the form of liquid chlorine, which is gasified before reaction, or in the form of chlorine gas, such as collected at the exit of a chlorine production plant. Applicants have noticed that the yield of tetrachloroethanes is practically independent of the purity of the chlorine, whether a 99.9% pure liquid chlorine or a 95% purity chlorine gas is used, in which the main impurity comprises $CO_2$, $O_2$, $N_2$ and CO.

The chlorine can be diluted with gases which are inert under the reaction conditions, such for example as gases of the type which have just been identified as impurities. A chlorine dilution by inert gases in a molecular ratio up to 1/1 is not detrimental to the reaction, but generally it is advantageous to make use of an excessive volume of such inert gases from the standpoint of economy and productivity.

The molar ratio chlorine to dichloroethylenes used ranges from 0.6 to 1.1, and in order to realize a maximum productivity, it is preferred to work with a molar ratio within the range of 0.7 to 0.95. The process can be operated with a molar ratio of below 0.7 but the productivity decreases as the molar ratio falls below 0.7.

The following examples are given by way of illustration, but not by way of limitation, of the practice of this invention:

EXAMPLES 1 TO 4

91 moles/hour of raw chlorine (97% purity) and 100 moles/hour of a mixture of dichloroethylenes (99.92% purity and free of stabilizer) but which contains 1,1-dichloroethane in Example 4, are introduced continuously at 55° to 60° C., under atmospheric pressure, into a reaction zone in the form of a nickel reactor, but in the absence of light radiations. The composition of the starting dichloroethylenes for each example is given in the following table. The molar ratio chlorine-dichloroethylenes is about 0.88 in Examples 1 to 3 and 0.90 in Example 4.

The residence time of reactants in the reactor is 5 hours. A liquid effluent, which is collected continuously from the reactor, is submitted to continuous distillation and the first running fraction, composed essentially of unreacted dichloroethylenes, is recycled to the reactor. The later running fractions are composed essentially of a mixture of tetrachloroethanes. The yield in tetrachloroethanes, based on dichloroethylenes converted, is 99.2 molar percent for Examples 1 to 4. The main impurity is pentachloroethane representing 0.6 molar percent.

The results are set forth in the following table:

The yield of tetrachloroethanes, based on dichloroethylenes converted, is only 93 molar percent.

EXAMPLE 5

In a glass reactor, there are introduced, in the absence of light radiations, at 50° to 55° C. and under atmospheric pressure, 81 moles/hour of gasified liquid chlorine, 100 moles/hour of a mixture of 1,1-dichloroethylene and trans- and cis-1,2-dichloroethylenes of 99.99% purity and free of stabilizer in the respective molar ratio of 1/0, 33/0, 33 and 0.170 g./hour of ferric chloride, corresponding to 0.001% by weight $FeCl_3$, based upon the reaction liquid phase. The residence time of reactants in the reactor is 4 hours and the conversion rate of dichloroethylenes at the end of this time is 80 molar percent.

A liquid effluent is collected continuously from the reactor and is submitted to continuous distillation. The first

CENTESIMAL MOLAR COMPOSITION*

| | 1 | | 2 | | 3 | | 4 | |
|---|---|---|---|---|---|---|---|---|
| | Entering into the reactor | Effluent from the reactor | Entering into the reactor | Effluent from the reactor | Entering into the reactor | Effluent from the reactor | Entering into the reactor | Effluent from the reactor |
| 1,1-dichloroethylene | 50 | 5 | 70 | 7.0 | 30 | 3.3 | 50 | 5.00 |
| Trans-1,2-dichloroethylene | 35 | 4.2 | 20 | 2.4 | 40 | 5.2 | 35 | 4.20 |
| Cis-1,2-dichloroethylene | 15 | 1.8 | 10 | 1.2 | 30 | 3.9 | 13 | 2.46 |
| 1,1,1,2-tetrachloroethane | | 44.7 | | 62.6 | | 26.5 | | 44.70 |
| 1,1,2,2-tetrachloroethane | | 43.7 | | 26.2 | | 60.5 | | 41.00 |
| Pentachloroethane | | 0.6 | | 0.6 | | 0.6 | | 0.60 |
| 1,1-dichloroethane | | | | | | | 2 | 1.44 |
| 1,1,1-trichloroethane | | | | | | | | 0.40 |
| 1,1,2-trichloroethane | | | | | | | | 0.20 |

* Traces (<0.08 mol. percent) of chlorinated organic compounds which are existing in the mixture of the starting dichloroethylenes are not shown.

By way of comparison, the chlorination reaction is carried out under the same operative conditions as in Examples 1 to 4 but with a mixture of dichloroethylenes representing the composition of Example 4 with 99.2% purity, containing phenol as the stabilizer in the amount of 0.08% by weight. It is observed that the chlorination is inoperative indicating that the amount of stabilizer inhibits the chlorination of dichloroethylenes.

Likewise by way of comparison, Example 1 is repeated but the reactor is equipped with a light radiation source. After 5 hours, the conversion rate of dichloroethylenes is 91.5 molar percent. A liquid effluent is collected continuously from the reactor which is submitted to continuous distillation. The first running fracton, essentially composed of dichloroethylenes, is recycled to the reactor. The last running fraction is composed of:

| | Molar percent |
|---|---|
| 1,1,2,2-tetrachloroethane | 44.1 |
| 1,1,1,2-tetrachloroethane | 44.8 |
| Heavy products (chlorinated $C_4$) expressed as 1,1-dichloroethylene | 4.4 |
| Pentachloroethane | 2.2 |
| Hexachloroethane | 0.5 |

The yield in tetrachloroethanes, based on the dichloroethylenes converted, is only 93.1 molar percent. These results are below those obtained when operating in the absence of light radiations.

In another comparative test, Example 1 is repeated but with a flow rate of 99% raw chlorine of 115 moles/hour, bringing the molar ratio of chlorine/dichloroethylenes to 1.12.

After 5 hours residence time in the reactor, the conversion rate of dichloroethylenes is 97.6 molar percent. A liquid effluent is collected continuously from the reactor, which is submitted continuously to distillation. The first running fractions are recycled to the reactor. The last running fraction is composed of:

| | Molar percent |
|---|---|
| 1,1,1,2-tetrachloroethane | 46.2 |
| 1,1,2,2-tetrachloroethane | 46.8 |
| Pentachloroethane | 7.0 |

running fraction is recycled to the reactor. The last running fraction is composed of:

| | Molar percent |
|---|---|
| 1,1,1,2-tetrachloroethane | 59.5 |
| 1,1,2,2-tetrachloroethane | 39.5 |
| Pentachloroethane | 0.6 |
| Chlorinated products heavier than the latter | 0.4 |

The yield of tetrachloroethanes, based on the diethylenes converted, is 99 molar percent.

Example 5 is repeated by way of comparison but by adding more ferric chloride such as 4.7 g. hour, which corresponds to about 0.03% by weight $FeCl_3$ based upon the liquid reaction phase.

The conversion rate of dichloroethylenes is 79 molar percent. The liquid effluent which flows continuously from the reactor has the following molar composition:

| | Percent |
|---|---|
| 1,1,1,2-tetrachloroethane | 42 |
| 1,1,2,2-tetrachloroethane | 19 |
| 1,1,1-trichloroethane | 3 |
| Trichloroethylene | 10 |
| Pentachloroethane | 5 |
| Dichloroethylenes (cis and trans mixture) | 21 |

The gases which escape continuously from the reactor are composed mainly of hydrochloric acid containing traces of chlorine. The yield of tetrachloroethanes based upon the converted dichloroethylenes is only 77.2 molar percent.

EXAMPLE 6

Example 5 is repeated but the ferric chloride is replaced with the small amount of nickel chloride. The yield of tetrachloroethanes, based upon the converted dichloroethylenes, is 99 molar percent.

It will be understood that changes may be made in the details of formulation and operation without departing from the spirit of the invention, especially as defined in the following claims.

We claim:

1. A process for the simultaneous preparation of symmetrical and unsymmetrical tetrachloroethanes by chlorination of dichloroethylenes comprising reacting a mixture containing 80 to 10 mole percent cis- and/or trans-1,2-dichloroethylene and 20 to 90 mole percent 1,1-dichloroethylene in the liquid phase with molecular chlorine in the absence of the catalyst and in the absence of light at a temperature within the range of 50–90° C. wherein the molar ratio of chlorine to the dichloroethylenes is within a range of 0.6 to 1.1 and wherein the dichloroethylenes contain less than 0.001% by weight of a stabilizer.

2. The process as claimed in claim 1 in which the chlorine/dichloroethylenes are reacted in the molar ratio within the range of 0.7 to 0.95.

3. The process as claimed in claim 1 in which the residence time of the reactants in the reaction zone is within the range of 2 to 9 hours.

4. The process as claimed in claim 1 in which the residence time of the reactants in the reaction zone is within the range of 4 to 6 hours.

References Cited

UNITED STATES PATENTS

| | | | |
|---|---|---|---|
| 2,318,323 | 5/1943 | Cunradi, et al. | 260—654 H X |

FOREIGN PATENTS

| | | | |
|---|---|---|---|
| 530,482 | 9/1956 | Canada | 260—654 H |
| 530,649 | 7/1931 | Germany | 260—658 R |
| 3,820,553 | 10/1963 | Japan | 260—654 H |

OTHER REFERENCES

Outsma et al., J. Am. Chem. Soc., 86, pp. 3807–3814, 1964.

HOWARD T. MARS, Primary Examiner

U.S. Cl. X.R.

260—654 H

UNITED STATES PATENT OFFICE
CERTIFICATE OF CORRECTION

Patent No. 3,637,875 Dated January 25, 1972

Inventor(s) Yves Correia; Jean-Claude Strini

It is certified that error appears in the above-identified patent and that said Letters Patent are hereby corrected as shown below:

column 3, line 37, change "representing" to "presenting"

column 3, line 51, under Molar percent, change "44.1" to "48.1"

Signed and sealed this 19th day of September 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334